United States Patent Office 3,369,062
Patented Feb. 13, 1968

3,369,062
DIMETHYL 1-METHYL-2-CARBAMOYLVINYL PHOSPHATE
Loyal F. Ward, Jr., Modesto, Calif., assignor to Shell Oil Company, New York, N.Y., a corporation of Delaware
No Drawing. Filed Oct. 6, 1964, Ser. No. 401,981
1 Claim. (Cl. 260—943)

ABSTRACT OF THE DISCLOSURE

Dimethyl 1-methyl-2-carbamoylvinyl phosphate useful as an insecticide.

---

This invention relates to an organophosphorus compound that has been found to be an effective insecticide, with particularly high activity toward aphids, mites and worms. Further, this compound is effective as a systemic insecticide—that is, if supplied to the soil in contact with the roots of a plant, or applied on any portion of the plant, the compound penetrates into the plant and is disseminated (trans-located) therein without injury to the plant, yet effectively destroys insects which chew upon, or suck juices from, the plant.

The compound of this invention is dimethyl 1-methyl-2-carbamolyvinyl phosphate, of the formula

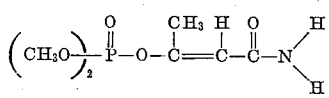

hereinafter designated, for the sake of brevity, as Compound A.

This compound is readily prepared by the reaction of 3-hydroxy-crotonyl chloride dimethyl phosphate with ammonium hydroxide, the following preparation being illustrative ("parts" means parts by weight unless otherwise designated, and "parts by weight" bears the same relation to parts by volume as does the kilogram to the liter):

EXAMPLE I 3-hydroxycrotonyl chloride dimethyl phosphate was prepared by the hydrogenolysis of dimethyl 1-methyl-2-(1-phenylethoxycarbonyl)vinyl phosphate (Spencer and Todd, J. Chem. Soc.., 1958, 2968), and chlorination of the resulting product with thionyl chloride.

21 parts of the acid chloride was dissolved in approximately 50 parts by volume of methylene chloride. The mixture was cooled to −30° C. and was mixed with 22 parts by volume of 9.25 N ammonia solution over a period of 10 minutes, the temperature of the mixture being held at −30 to −20° C. Then the mixture was slowly warmed to room temperature, then cooled to −10° C. and neutralized (litmus paper) with 1 N hydrochloric acid. Two liquid layers separated. The organic layer was water-washed, dried and filtered. The aqueous layer was saturated with ammonium chloride and extracted with methylene chloride. The extract was washed with saturated ammonium chloride solution, dried and filtered. The two organic solutions were combined and stripped of solvent. Before stripping was complete, ether was added, resulting in a precipitate. The mixture was cooled to 20° C., filtered, the filtrate washed with ether containing 10% methylene chloride, then ether, then pentane, then dried to give 14 parts of dimethyl 1-methyl-2-carbamoylvinyl phosphate, melting point: 102–103° C. The identity of the product was established by infra-red spectrum analysis, and by elemental analysis.

*Elemental analysis.*—Calculated (percent by weight): Chlorine, 0; nitrogen, 6.7; phosphorus, 14.8. Found: Chlorine, less than 0.1; nitrogen, 6.6; phosphorus, 14.8.

Work-up of the mother liquor yielded an additional one part of the product.

This compound has been found to be an effective insecticide against a variety of insects typical of various kinds of insects, including flies, aphids, mites, caterpillars (including worms) and mosquitoes. The compound is particularly effective against aphids, mites, and worms.

By the term "insects" is meant not only the members of the class Insecta, but also related or similar invertebrate animal organisms belonging to the allied classes of arthropods and including ticks, mites, spiders, and the like.

The compound of the invention is effective against the immature forms of insects as well as against the mature forms which attack plants. Thus, this compound kills "worms," by which is meant not only the true worms, but also those immature forms of insects—larvae, etc.—which are generally known as "worms," and including larvae of the western spotted cucumber beetle (*Diabrotica undecimpunctata undecimpunctata*), corn earworms (*Heliothis zea*), imported cabbage worms (*Pieris rapae*), Pacific coast wireworms (*Limonium canus*) and the like.

The effectiveness of the compound of this invention as an insecticide is demonstrated by the following experiments and the results thereof.

EXAMPLE II

Solutions of Compound A were made up employing a suitable bland solvent. Tests were carried out using the common housefly (*Musca domestica*) as the test insect, the method being that described by Y. P. Sun, Journal of Economic Entomology, volume 43, pages 45 et seq. (1950). The effectiveness of Compound A was determined as the concentration (percent weight/volume) of Compound A in the solution required to effect 50% mortality of the houseflies—i.e., the $LC_{50}$ concentration. This concentration was determined to be 0.0055%.

EXAMPLE III

Solutions of Compound A were made up employing acetone as the solvent and then diluted with water containing an emulsifier. The solutions were tested for toxicity against the two-spotted spider mite (*Tetranychus telarius*) and the pea aphid (*Macrosiphum pisi*), by spraying groups of plants infested with the insects under controlled conditions which varied from one test to the other only with respect to the concentration of the toxic agent. Thus, in each of the several tests, the same total volume of spray was used. The activity of Compound A with respect to the corn earworm (*Heliothis zea*) was determined by caging corn earworm larvae on cut broad bean plants inserted in water, after formulations of the test compound (prepared by dissolving acetone solutions of the compounds in water containing a wetting agent) had been sprayed thereon. Two replicates were used with each test, various tests being directed to different concentrations of the test compound in the liquid formulations. In each case, parallel tests were conducted employing a standard insecticide (parathion in the cases of the pea aphid and the two-spotted mite; dieldrin in the case of the corn earworm). The toxicity of Compound A in each instance was compared to that of the standard, its relative toxicity being expressed in terms of the relationship between the amount of Compound A and the amount of the standard insecticide required to produce the same percentage of mortality in the test insects. Assigning the standard insecticide an arbitrary rating of 100, the toxicity of Compound A was expressed in terms of the toxicity index, which compares the toxicity of Compound A on a percentage basis with that of the standard insecticide. That is to say, a test compound having a toxicity index of 50 would be half as active, while one having a toxicity index of 200 would be twice as active, as the standard insecticide. Table I presents the data found.

Table I.—Toxicity index for test insect

| Test compound | A |
|---|---|
| Pea aphid | 404 |
| Corn earworm | 136 |
| Two-spotted mite | 578 |

The compound of this invention can be employed for insecticidal purposes by the use of any of the methods which are conventionally employed in the art. For example, the compound can either be sprayed or otherwise applied in the form of a solution or dispersion, or it can be absorbed on an inert, finely divided solid and applied as a dust. Useful solutions for application by sprayed, brushing, dipping, and the like can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solution, representative materials of this character being fatty acid soaps, rosin salts, saponins, gelatin, casein, long-chain fatty alcohols, alkyl aryl sulfonates, long-chain alkyl sulfonates, phenol-ethylene oxide condensates, $C_{12}$ and $C_{20}$ amines and ammonium salts, and the like. These solutions can be employed as such, or more preferably they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the insecticide of the present invention can be employed as an aerosol, as by dispersing the same into the atmosphere by means of a compressed gas.

The concentration of the insecticide to be used with the above carriers is dependent upon many factors, including the carrier employed, the method and conditions of application, and the insect species to be controlled, a proper consideration and resolution of these factors being within the skill of those versed in the insecticide art. In general, however, the insecticide of this invention is effective in a concentration of from about 0.01 to 0.5% based upon the total weight of the composition, though under some circumstances as little as about 0.00001% or as much as 2% or even more (for example, up to 25%) of the compound can be employed with good results from an insecticidal standpoint as wherein high concentrations of active material are used in low-volume sprays or dusts.

When employed as an insecticide, the compound of this invention can be employed either as the sole toxic ingredient of the insecticidal composition, or it can be employed in conjunction with other insecticidally active materials. Representative insecticides of this latter class include the naturally occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl-p-nitrophenyl thiophosphate, azobenzene, dimethyl 2,2-dichlorovinyl phosphate, dimethyl 1,2-dibromo-2,2-dichloroethyl phosphate, and the various compounds of arsenic, lead and/or fluorine.

Compound A may be applied to wet seeds as a concentrate on activated carbon. Methyl cellulose can be employed to aid in the formation of a durable coating on the seed if desired. The seeds are tumbled in the carbon-toxicant mixture until a uniform coating is achieved. The quality of the seed coat is dependent upon the quantity of water used to wet the seed, the quantity of methyl cellulose required, the type and adhesive quality of the carrier employed and the type of equipment used to mix the seed and toxicant. Hence the proportion of diluent and sticker may vary considerably without departing from the scope of the present invention. It should also be understood that the type and quantity of diluent and sticker in the seed dressing may vary very considerably.

I claim as my invention:
1. Dimethyl 1-methyl-2-carbamoylvinyl phosphate.

References Cited

UNITED STATES PATENTS

| 2,802,855 | 8/1957 | Whetstone et al. | 260—943 |
| 3,258,394 | 6/1966 | Hall et al. | 260—943 X |

CHARLES B. PARKER, *Primary Examiner.*

B. BILLIAN, *Assistant Examiner.*